United States Patent [19]
Cudak et al.

[11] Patent Number: 5,640,396
[45] Date of Patent: Jun. 17, 1997

[54] APPARATUS AND METHOD FOR SYNCHRONIZING A RURAL WIRELESS FIXED ACCESS UNIT INTO A TDMA SYSTEM

[75] Inventors: Mark Conrad Cudak, McHenry; James Robert Kelton, Oak Park; Bruce Dale Mueller, Palatine, all of Ill.

[73] Assignee: Motorola, Inc., Schaumburg, Ill.

[21] Appl. No.: 523,882

[22] Filed: Sep. 6, 1995

[51] Int. Cl.$^6$ ............................ H04B 7/212
[52] U.S. Cl. ............... 370/337; 370/348; 370/350; 370/519; 455/54.2
[58] Field of Search .................. 455/51.1, 54.1, 455/54.2, 56.1, 69, 70; 370/85.8, 95.1, 95.2, 95.3, 108, 103, 105.2, 329, 336, 337, 345, 346, 347, 350, 442, 503, 507, 509, 519; 375/358, 371, 372

[56] References Cited

U.S. PATENT DOCUMENTS

| | | | |
|---|---|---|---|
| 3,350,644 | 10/1967 | McNair | 375/371 |
| 4,470,141 | 9/1984 | Takada | 370/103 |
| 4,472,802 | 9/1984 | Pin et al. | 370/103 |
| 4,642,806 | 2/1987 | Hewitt et al. | 370/95.1 |
| 5,363,373 | 11/1994 | Nakahara et al. | 370/95.3 |
| 5,388,102 | 2/1995 | Griffith et al. | 455/51.1 |
| 5,488,611 | 1/1996 | Zijderhand et al. | 370/108 |
| 5,541,928 | 7/1996 | Kobayashi et al. | 455/54.2 |

OTHER PUBLICATIONS

ETSI/GSM, 4.0.0., Layer 1 —General Requirements, 19 pages, Oct. 1992.
GSM 04.08 —v. 4.4.0, pp. 2–3 and 6–7.
GSM 05.10, 4.1.1, Radio Sub-System Synchronization, Apr. 1993.
EIA/TIA Interim Standard, Cellular System Dual-Mode Mobile Station-Base Station Compatibility Standard, IS-54, May 1990.
Baseline Text for TAG 3 (PACS), Joint Technical Committee (JTC), Feb. 2, 1995, 033R1, 143 pages.

*Primary Examiner*—Benedict V. Safourek
*Attorney, Agent, or Firm*—Heather L. Creps

[57] ABSTRACT

A method of synchronizing a fixed access unit (16) into a time division multiple access (TDMA) system (10). The method includes the steps of receiving a first timing advance channel time slot (86) at the fixed access unit (16), sending a message advanced in time by an offset value over a second time slot (88), receiving an acknowledgment from the TDMA system (10) that the message was received, and advancing a subsequently transmitted communication based on the offset value.

14 Claims, 3 Drawing Sheets

BASE EQUIPMENT FLOW CHART

R-WAFU EQUIPMENT FLOW CHART

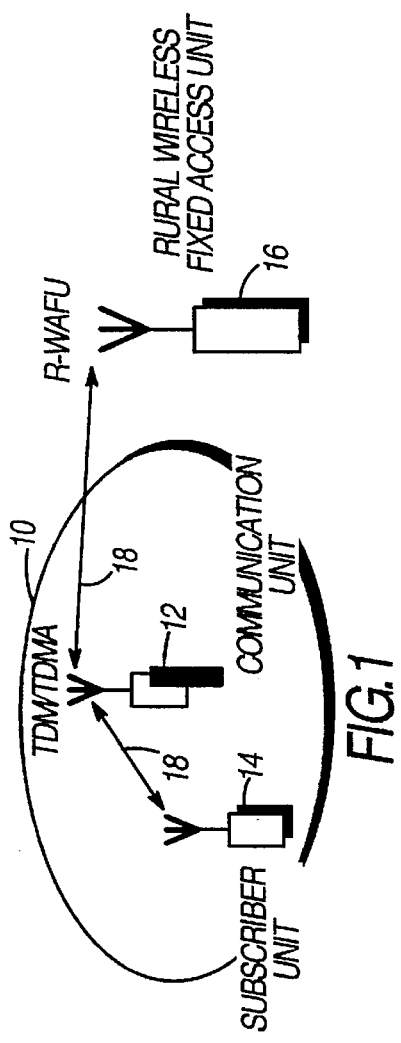
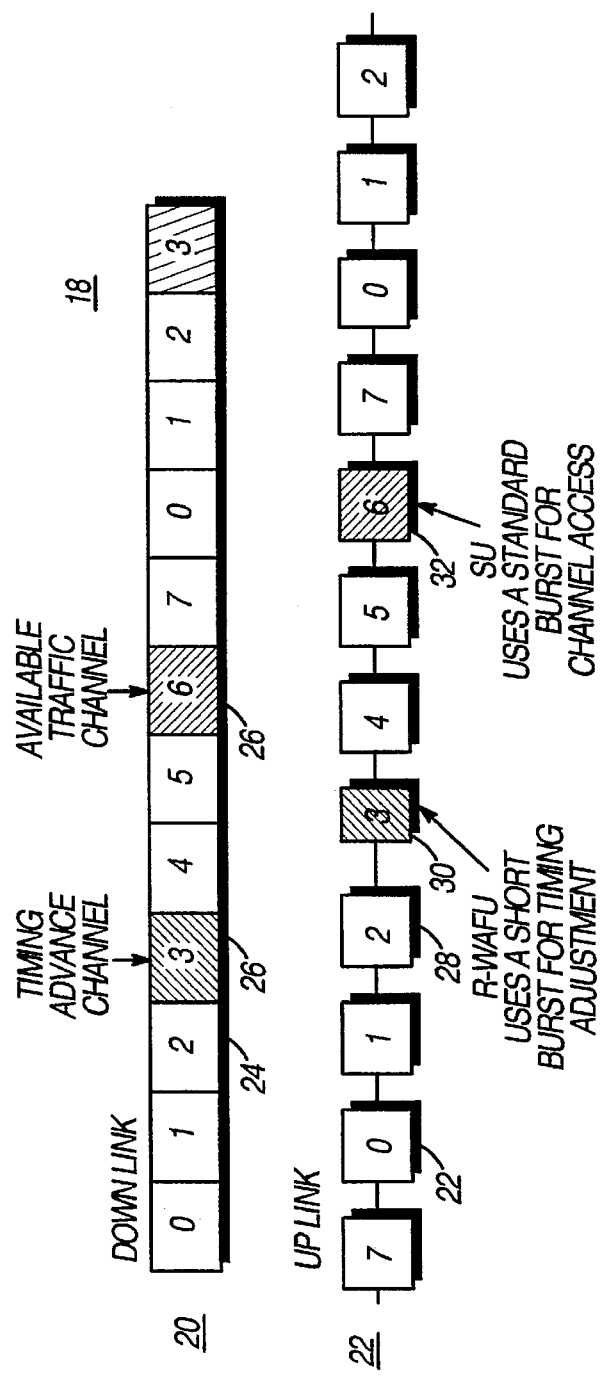

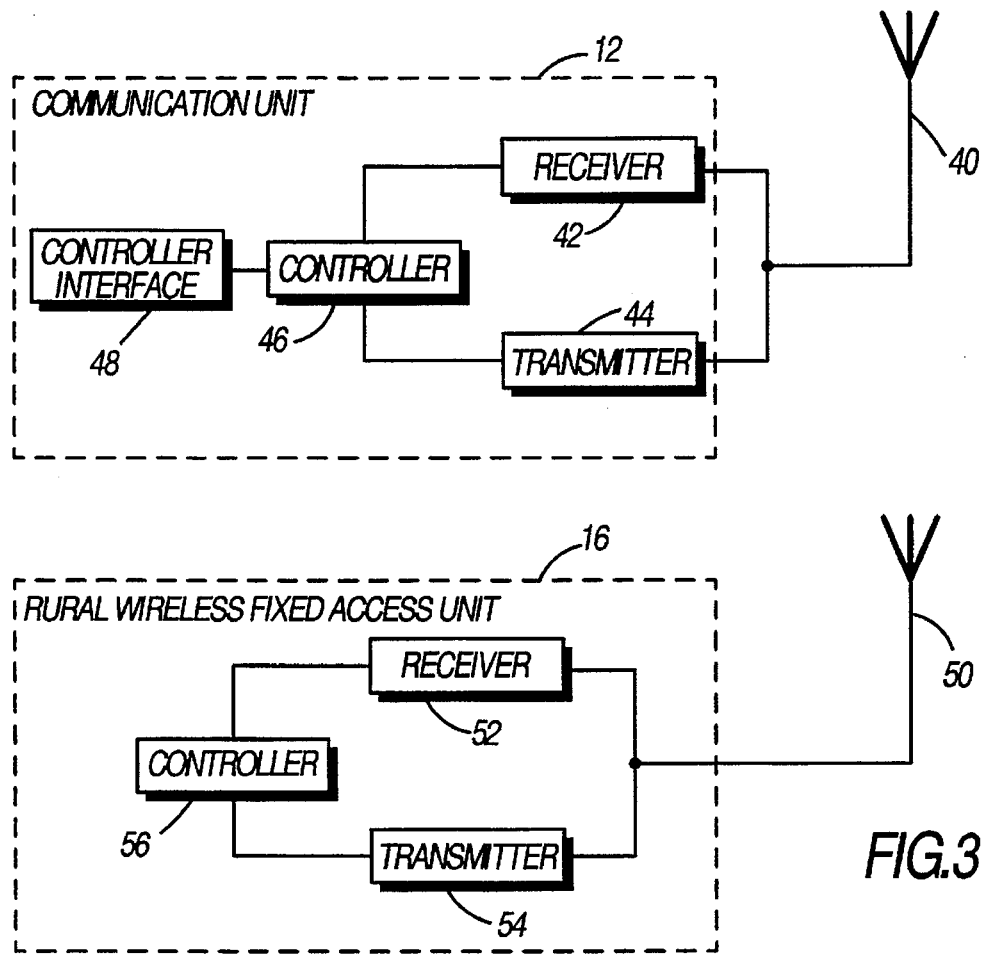
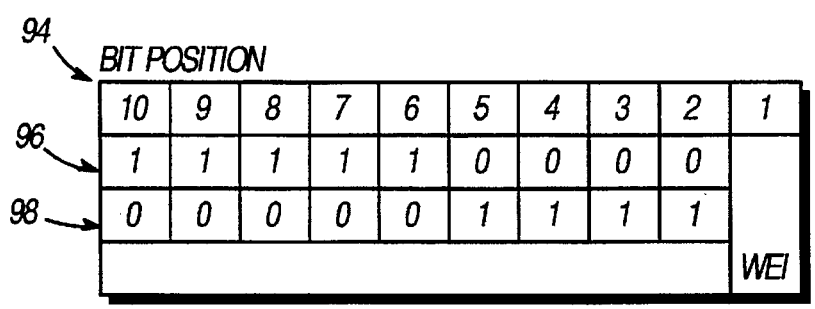
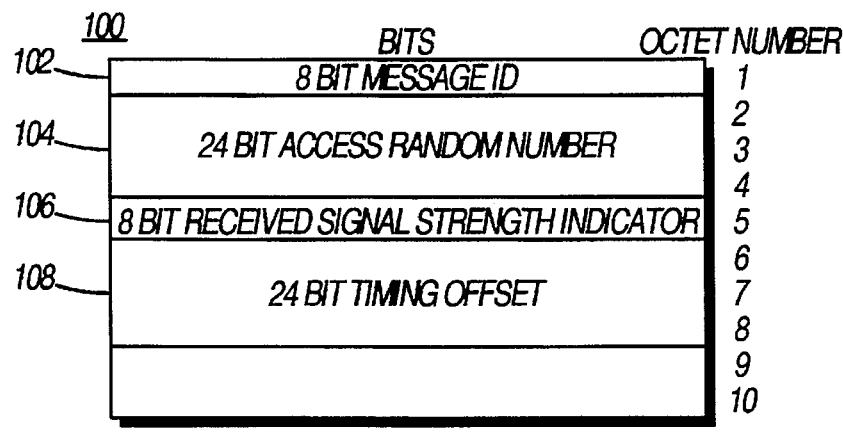
FIG.3
FIG.5

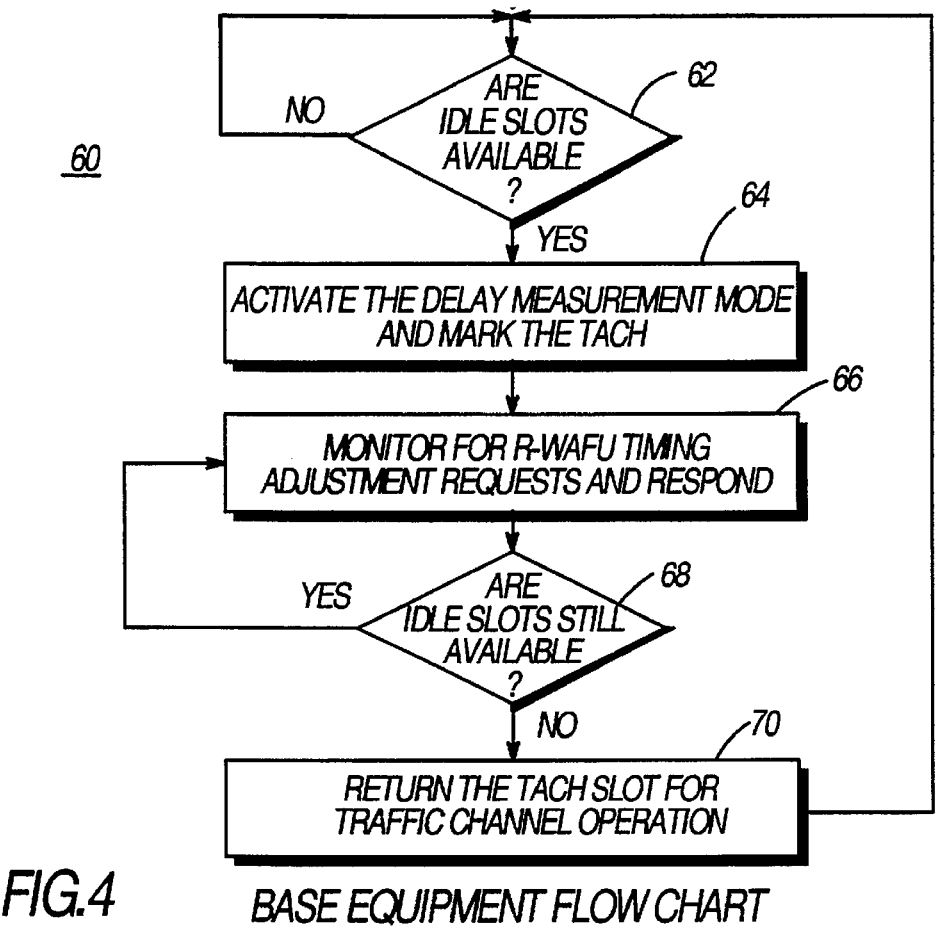
FIG.4  BASE EQUIPMENT FLOW CHART
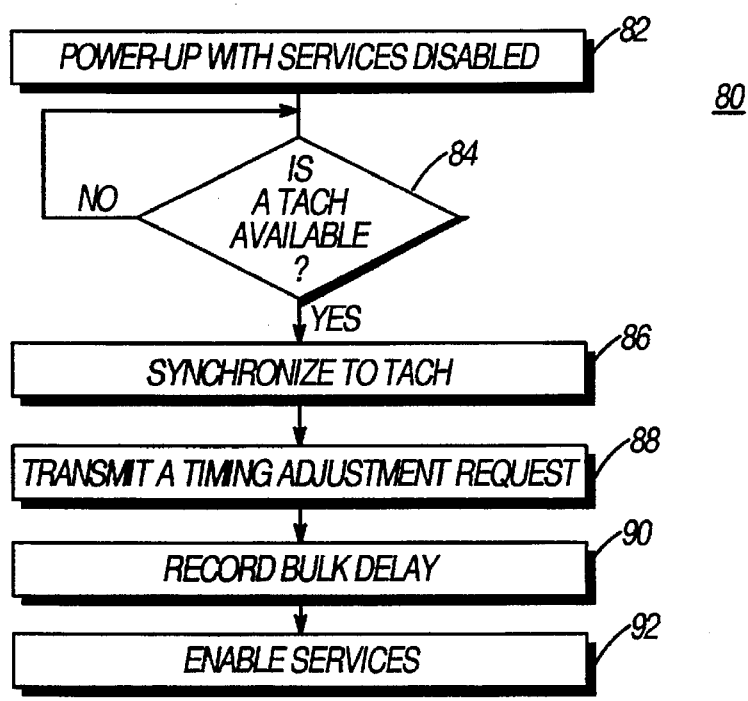
R-WAFU EQUIPMENT FLOW CHART

APPARATUS AND METHOD FOR SYNCHRONIZING A RURAL WIRELESS FIXED ACCESS UNIT INTO A TDMA SYSTEM

FIELD OF THE INVENTION

This invention relates generally to time division multiple access (TDMA) systems, and more particularly to wireless fixed access units in a TDMA system.

BACKGROUND OF THE INVENTION

In conventional microcellular wireless communication systems, timing advance is not supported because portable units and local fixed access units are typically within 1000 feet of the radio port. One such microcellular wireless communication system is the personal access communication system (PACS) defined by the Joint Technical Committee as Air Interface Specification PN3418. In such conventional systems, timing advance is not necessary since the maximum delay can be compensated for by a timing adjustment algorithm defined by the air interface.

However, if the operating environment were extended to applications using a rural wireless fixed access unit or using a wired cable service, a fixed bulk delay is introduced into the system. Conventional microcellular systems will not operate in such applications.

One possible solution to this problem is provided in cellular communication systems where a subscriber's per call access technique provides information to determine whether to perform timing advance. Although this method could be applied to microcellular systems, modifying a subscriber's per call access technique would add undesirable cost and complexity to the system. Further, adding a process for performing timing advance on a per call access basis would degrade overall system performance and would interfere with subscribers that do not require timing advance.

Accordingly, there is a need for a method and apparatus for performing timing advance for rural wireless fixed access subscribers without interfering with other subscribers who do not require timing advance.

SUMMARY OF THE INVENTION

The present invention addresses this need by providing a method of synchronizing a fixed access unit into a time division multiple access (TDMA) system, a method of synchronizing a rural wireless fixed access unit with a communication unit in a TDMA system, a communication unit of a TDMA system, and a fixed access unit communicating with a TDMA system.

The method of synchronizing a fixed access unit into a TDMA system includes the steps of receiving a timing advance channel time slot at the fixed access unit, sending a message over the time slot that is advanced in time by an offset value, receiving an acknowledgment from the TDMA system that the message was received, and advancing a subsequently transmitted communication based on the offset value. The method of synchronizing a fixed access unit with a communication unit in a TDMA system includes the steps of transmitting a broadcast message over a first time slot of a timing advance channel, receiving a request for service message from the fixed access unit over a second timing advance channel, and transmitting an acknowledge message over the first timing advance channel to the fixed access unit.

The communication unit of a TDMA system includes, a transmitter, a receiver, and a controller in communication with the transmitter and the receiver. The controller marks an idle time slot as a first timing advance channel time slot. The transmitter sends a broadcast message over the first timing advance channel time slot. The receiver detects a request for service message from a fixed access unit over a second timing advance channel, and the transmitter sends an acknowledge message over the first timing advance channel to the fixed access unit.

The rural wireless fixed access unit communicating with a TDMA system includes an antenna, a receiver coupled to the antenna, and a transmitter coupled to the antenna. The transmitter sends a message over the time slot. The message is advanced in time by an offset value with respect to the time slot, and the receiver detects a timing advance channel time slot.

The invention itself, together with its intended advantages will best be understood by reference to the following detailed description, taken in conjunction with the accompanying drawings.

BRIEF DESCRIPTION OF THE DRAWINGS

FIG. 1 is a block diagram illustrating a preferred embodiment of a TDMA system.

FIG. 2 is a diagram of the air interface of FIG. 1.

FIG. 3 is a block diagram of the communication unit and rural wireless fixed access unit of FIG. 1.

FIG. 4 is a flowchart illustrating a preferred method of synchronizing a rural wireless fixed access unit.

FIG. 5 is a diagram illustrating a traffic channel message within the air interface of FIG. 1.

DETAILED DESCRIPTION OF THE PREFERRED EMBODIMENTS

FIG. 1 illustrates a time division multiplexed time division multiple access TDM/TDMA system 10. The communication system 10 includes a communication unit 12, a subscriber unit 14, and a remote wireless access fixed subscriber unit (R-WAFU) 16. The communication unit 12 communicates with the subscriber units 14, 16 via an air interface 18. In a particular preferred embodiment, the communication system 10 is a personal communication system, such as the personal access communication system PACS system. The PACS system is defined by the Joint Technical Committee as Air Interface Specification PN 3498 ("the "PACS Standard"). During operation, a subscriber using the subscriber unit 14 or the remote wireless access fixed unit 16 can transmit and receive messages over the air interface 18 to communicate with the communication unit 12. In this manner, the subscriber units 14, 16 provide for personal communication such as a telephone conversation or data communication. Those skilled in the art will understand that the communication system 10 is typically connected to other communication systems such as the public switch telephone network (PSTN). Further, those skilled in the art will appreciate that the communication system is not limited to a PACS type microcellular system. For example, in an alternative preferred embodiment, the communication system is a trunked cable system.

Referring to FIG. 2, a preferred embodiment of the air interface 18 is illustrated. The air interface 18 includes a downlink 20 and an uplink channel 22. The downlink channel 20 includes a plurality of time slots 24. According to the preferred embodiment at least one of the time slots 24 is marked as a timing advance channel and thereby becomes a timing advance channel time slot 26. The uplink channel 22 includes a plurality of time slots 28. Some of the time slots 28 are used for subscriber unit traffic and are designated subscriber unit time slots 32. Time slots from a remote wireless access fixed unit have a shortened burst and are designated R-WAFU time slots 30.

FIG. 3 illustrates a preferred embodiment of the communication unit 12 and the R-WAFU 16. The communication unit 12 includes an antenna 40, a receiver 42, a transmitter 44, and a controller 46. The controller is connected to the receiver 42 and the transmitter 44, as well as a controller interface 48. The receiver 42 and the transmitter 44 are each connected to the antenna 40. The controller 46 is used to transmit and receive messages over the air interface 18 via the antenna 40. In one embodiment, the communication unit 12 is a radio port as defined in the PACS standard.

The R-WAFU 16 has an architecture similar to the communication unit 12. The R-WAFU 16 includes an antenna 50, a receiver 52, a transmitter 54, and a controller 56. The R-WAFU 16 in one embodiment is defined as a subscriber unit in the PACS standard. The RWAFU 16 communicates with the communication unit 12 over the air interface 18 via the antenna 50. The R-WAFU 16 is typically located at a greater distance than standard wireless fixed access units such as the subscriber unit 14. Due to the additional distance between the R-WAFU 16 and the communication unit 12, the R-WAFU 16 generally needs to advance transmission in time to compensate for the delay due to this additional distance. To determine the correct amount of advancement, the controllers 46 and 56 within the communication unit 12 and the R-WAFU 16 are preferably programmed to perform a timing advance channel method to adjust timing offsets.

FIG. 4 shows a method for performing timing advance within the controllers 46 and 56. Within the controller 46, a method 60 of performing timing advancement within the communication unit 12 is illustrated. First, at decision step 62, the controller 46 determines whether idle slots are available within the air interface downlink 20. If idle slots are available then a delay measurement mode is activated within the communication unit 12 and a timing advance channel (TACH) time slot 26 is marked within the downlink 20 of the air interface 18. Next, at step 66, the controller 46 monitors for timing adjustment requests from the R-WAFU 16. Next, at decision step 68, the controller 46 determines whether idle slots within the downlink 20 are still available. If idle slots are still available then monitoring step 66 is repeated. However, if no slots are available then the traffic advance channel time slot 26 is converted into a traffic channel time slot 24, at step 70 and processing then is continued back at decision step 62. Thus, the method 60 within the controller 46 marks idle time slots within the air interface 18 on the downlink 20 as timing advance channel time slots, so that the R-WAFU 16 can determine the correct advance time needed to compensate for any bulk delay between the communication units 12 and the R-WAFU 16.

Within the rural wireless fixed access unit 16, a method 80 of performing timing advance channel alignment is illustrated. First, at step 82, the R-WAFU is powered up with its services disabled. At decision step 84, it is determined whether a TACH is available. If no TACH is available then the R-WAFU 16 waits until a TACH becomes available. When a TACH becomes available then the R-WAFU 16 synchronizes to the received TACH, at step 86. Next, at step 88, the R-WAFU 16 transmits a timing adjustment request to the communication unit 12 over the air interface 18. More specifically, the R-WAFU 16 sends a message over the TACH time slot 30 on the uplink 22. Based on a response from the communication unit 12, the R-WAFU 16 determines whether an appropriate advancement in time has been made and thereby records a bulk delay, at step 90.

One method of determining the bulk delay is to receive a message from the communication unit 12 based on a measurement within the communication unit 12 as to the measured delay. An alternative method of determining the delay, is to have the R-WAFU 16 transmit a series of messages to the communication unit 12 over the TACH 30 with a gradually increasing offset value. After the R-WAFU 16 sends each timing adjustment request message to the communication unit, the R-WAFU 16 waits for a response from the communication unit 12. If the R-WAFU 16 does not receive a response from the communication unit 12 within a predetermined length of time, the R-WAFU 16 assumes that the communication unit 12 could not receive the timing alignment request message because of the bulk delay. In this case, the R-WAFU 16 sends a second timing adjustment request message with a timing advance offset value greater than the offset value of first message to the communication unit 12. The R-WAFU 16 then again waits for a response from the communication unit 12. If no response is received, then the R-WAFU 16 continues to send timing adjustment request messages to the communication unit 12 with each further message advanced by a greater period of time then preceding messages. Eventually, after sending an appropriate number of messages, the R-WAFU 16 will receive an acknowledgment response from the communication unit 12. At this time, the R-WAFU 16 records the timing advance offset value used for the last transmitted message as the appropriate time advancement offset value for the bulk delay.

Finally, at step 92, the R-WAFU 16 enables services on the unit. Each transmission after services have been enabled at step 92, are advanced in time based on the recorded offset value compensating for bulk delay, determined at step 90. In this manner, the R-WAFU 16 compensates for bulk delay due to the distance between the R-WAFU 16 and the communication unit 12. Those skilled in the art will appreciate that the timing advance channel process to compensate for bulk delay needs only to be performed once after power up for each R-WAFU 16. Thus, the preferred embodiment has the benefit of allowing R-WAFU units to perform timing advance channel alignment without affecting other subscriber units 14 that do not need to perform such alignment. In addition, the preferred embodiment has the benefit of only performing timing advance channel alignment when idle time slots are available. Further, the preferred channel alignment method does not need to be performed on a per call basis. Therefore, the timing advance channel method does not interfere with the capacity of the system 10 to perform voice or data communication.

Referring to FIG. 5, a preferred method of marking a TACH 26 is illustrated. In the preferred system, a slow channel having 10 bits is defined within a time slot 24 of the downlink 20. A TACH 26 is marked as an unavailable traffic channel 96 or marked as a timing advance channel time slot 98 with the bit patterns shown in FIG. 5. Note, that the unavailable traffic channel 96 of slow channel 94 matches a slow channel definition of a marked idle time slot as defined in the PACS standard. Although other bit patterns may equally be used the preferred pattern is the complement of the unavailable traffic channel 96 in bit positions 2–10.

Within the TACH 26, a fast channel 100 is illustrated in FIG. 5. The fast channel 100 includes an 8-bit message identifier 102, a 24-bit access random number 104, an 8-bit received signal strength indicator 106, and a 24-bit timing offset 108. Those skilled in the art will appreciate that the specific format used within the TACH 26 may be modified and the format shown in FIG. 5 is merely exemplary.

Further advantages and modifications of the above described apparatus and method will readily occur to those skilled in the art. The invention, in its broader aspects, is therefore not limited to the specific details, representative apparatus, and illustrative examples shown and described above. Various modifications and variations can be made to the above specification without departing from the scope or spirit of the present invention, and it is intended that the present invention cover all such modifications and variations provided they come within the scope of the following claims and their equivalents.

What is claimed is:

1. A method of synchronizing a fixed access unit into a time division multiple access (TDMA) system comprising the steps of:

receiving a first timing advance channel time slot at the fixed access unit;

sending a message over a second timing advance channel time slot, said message advanced in time by an offset value with respect to said first timing advance channel time slot;

receiving an acknowledgment from the TDMA system that said message was received; and advancing a subsequently transmitted communication based on the offset value.

2. The method of claim 1, further comprising the step of powering up the fixed access unit prior to receiving the first timing advance channel time slot.

3. The method of claim 1, wherein said offset value comprises a bulk delay based on the distance between a nearest communication unit of the TDMA system and the fixed access unit.

4. The method of claim 1, where the subsequently transmitted communication comprises an initial request to place a call and the communication is transmitted over a control channel of the TDMA system.

5. The method of claim 1, wherein the subsequently transmitted communication comprises transmission of a digitized voice signal over a traffic channel of the time division multiple access system.

6. A method of synchronizing a rural wireless fixed access unit with a communication unit in a time division multiple access system comprising the steps of:

transmitting a broadcast message over a timing advance channel;

receiving a request for service message from the rural wireless fixed access unit over the timing advance channel;

transmitting an acknowledge message over the timing advance channel to the rural wireless fixed access unit the acknowledge message including an offset value based on a distance between the rural wireless fixed access unit and the communication unit; and receiving a communication message from the wireless fixed access unit, a timing of the communication message advanced based on the offset value.

7. The method of claim 6, further comprising decoding the request for service message.

8. The method of claim 6, further comprising marking an idle channel of the time division multiple access system as a timing advance channel time slot prior to transmitting the broadcast message.

9. The method of claim 8, further comprising unmarking the timing advance channel time slot and returning the timing advance channel time slot for traffic channel communication.

10. A communication unit of a time division multiple access system comprising:

a transmitter;

a receiver;

a controller in communication with the transmitter and the receiver, said controller defining a first timing advance channel by marking an idle time slot as a timing advance channel time slot;

said transmitter sending a broadcast message over the first timing advance channel;

said receiver detecting a request for service message from a fixed access unit over a second timing advance channel; and said transmitter sending an acknowledge message over the first timing advance channel to the fixed access unit.

11. The communication unit of claim 10, wherein said communication unit comprises a radio port within a personal communication system.

12. A rural wireless fixed access unit communicating with a time division multiple access (TDMA) system comprising:

an antenna;

a receiver coupled to the antenna, said receiver receiving a first timing advance channel time slot; and a transmitter coupled to the antenna, said transmitter sending a message over a second timing advance channel time slot the message having been advanced in time by an offset value, the receiver receiving an acknowledgment from the TDMA system that said message was received by the TDMA system and the transmitter advancing a subsequently transmitted communication based on the offset value.

13. The rural wireless fixed access unit of claim 12, wherein said offset value corresponds to a bulk delay based on the distance between a nearest communication unit of the time division multiple access system and the rural wireless fixed access unit.

14. The rural wireless fixed access unit of claim 12, wherein the subsequently transmitted communication comprises an initial request to place a call and the communication is transmitted over a control channel of the time division multiple access system.

\* \* \* \* \*